US012748075B2

(12) United States Patent
Palzer et al.

(10) Patent No.: US 12,748,075 B2
(45) Date of Patent: Sep. 29, 2026

(54) SENSOR, METHOD AND COMPUTER PROGRAM FOR DETERMINING THE DENSITY OR COMPOSITION OF A FLUID

(71) Applicant: WoePal GmbH, Trierweiler-Sirzenich (DE)

(72) Inventors: Stefan Palzer, Trierweiler-Sirzenich (DE); Gabriel Rodriguez Gutierrez, Dortmund (DE); Alvaro Ortiz Perez, Dortmund (DE)

(73) Assignee: WoePal GmbH, Trierweiler-Sirzenich (DE)

( * ) Notice: Subject to any disclaimer, the term of this patent is extended or adjusted under 35 U.S.C. 154(b) by 269 days.

(21) Appl. No.: 18/643,633

(22) Filed: Apr. 23, 2024

(65) Prior Publication Data

US 2025/0052720 A1 Feb. 13, 2025

(30) Foreign Application Priority Data

Aug. 7, 2023 (EP) .................................... 23190024

(51) Int. Cl.
*G01N 29/036* (2006.01)

(52) U.S. Cl.
CPC ..... *G01N 29/036* (2013.01); *G01N 2291/014* (2013.01); *G01N 2291/021* (2013.01); *G01N 2291/02818* (2013.01)

(58) Field of Classification Search
CPC ........... G01N 29/036; G01N 2291/014; G01N 2291/021; G01N 2291/02818; G01N 9/002; G01N 33/004; G01N 33/005; G01N 2291/0212; G01N 2291/0215; G01N 2291/02809; G01N 29/32; G01N 29/42; G01N 29/4427; G01N 29/46; G01N 29/022; G01N 9/266; G01N 9/36
See application file for complete search history.

(56) References Cited

U.S. PATENT DOCUMENTS

| | | | | |
|---|---|---|---|---|
| 2014/0005958 A1* | 1/2014 | Baliga | G01M 3/243 | 702/51 |
| 2019/0041363 A1* | 2/2019 | Tumpold | G01N 29/4436 | |
| 2022/0136957 A1* | 5/2022 | Biesinger | G01N 29/032 | 73/24.02 |
| 2023/0243796 A1* | 8/2023 | Furuya | G01N 33/005 | 73/24.01 |
| 2024/0151689 A1* | 5/2024 | Theuss | G01N 33/005 | |

FOREIGN PATENT DOCUMENTS

| | | |
|---|---|---|
| DE | 102014221475 A1 | 4/2016 |
| EP | 2763381 A1 | 8/2014 |

OTHER PUBLICATIONS

SiSonic Design Guide from Knowles Acoustics pp. 1-29.

* cited by examiner

*Primary Examiner* — Xin Y Zhong
(74) *Attorney, Agent, or Firm* — COZEN O'CONNOR

(57) ABSTRACT

A sensor having a MEMS microphone (1) and a processor (2). The MEMS microphone (1) having a noise spectrum depending on a fluid to be analyzed. The processor (2) is configured to receive a measurement signal from the MEMS microphone; to identify a characteristic of the noise spectrum of the MEMS microphone in the measurement signal; and to determine a property of the fluid based on the characteristic identified.

20 Claims, 4 Drawing Sheets

SENSOR, METHOD AND COMPUTER PROGRAM FOR DETERMINING THE DENSITY OR COMPOSITION OF A FLUID

BACKGROUND OF THE INVENTION

1. Field of the Invention

The present invention relates to a sensor and a computer program for determining the density and/or composition of a fluid.

2. Description of the Related Art

The measurement of the composition of a gas, i.e. the concentration of a certain molecule in gas consisting of a mixture of molecules, is technically complex. There are many different sensor technologies for detecting different kind of gases. However, all of them are either complex or degenerate over time.

The measurement of a density of a fluid is normally done by a combined measurement of pressure, temperature and volume. However, requires that the fluid to be analyzed is closed in a measurement chamber and three distinct measurements must be done.

It is known to use ultrasonic sound to detect gas leaks by detecting the sound of the gas leak. For these so-called ultrasonic gas leak sensors also MEMS microphones are used. US2014/0005958A1 or DE102014221475A1 disclose such ultrasonic gas leak sensors. However, they only allow to detect a gas leak, but do not allow to measure a composition or concentration or density of a gas.

The publication "SiSonic Design Guide" from Knowles describes further details about the design of microphones.

EP2763381A1 discloses a chemical sensor in a smartphone for detecting a chemical substance. Such a chemical sensor could be used in breath analysis sensors, e.g. to determine the blood alcohol level. It is disclosed that the microphone of the smartphone can be used to detect, if the user is actually breathing in the chemical sensor during the test. However, this solution has the disadvantage that the smartphone requires an additional hardware sensor for a particular chemical sensor.

SUMMARY OF THE INVENTION

It is the object of the invention to provide an alternative for the measurement of the composition or the density of a fluid.

According to the invention, this object is solved by a sensor, a method and a non-transitory computer program according to the independent claims.

The noise spectrum of a MEMS microphone depends on the fluid in the MEMS microphone, e.g. on its density. By identifying in the measurement signal of the MEMS microphone a characteristic of the noise spectrum of the MEMS microphone, e.g. the frequency of a resonant peak of the noise of the MEMS microphone, a property of the fluid surrounding the MEMS microphone can be determined. Typical properties which can be determined from the characteristic(s) of the noise spectrum are the density, viscosity or composition of the fluid. Since MEMS microphones are standard components produced in mass, this allows to realize such sensors by very simple and well available electronic components. It makes it even possible to convert any existing device with a MEMS microphone into a sensor for measuring the property of a fluid around the MEMS microphone.

The dependent claims refer to further advantageous embodiments.

Other embodiments according to the present invention are mentioned in the appended claims and the subsequent description of an embodiment of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, the same reference numbers have been allocated to the same or analogue element.

DETAILED DESCRIPTION OF THE PRESENTLY PREFERRED EMBODIMENTS

Figure 1:
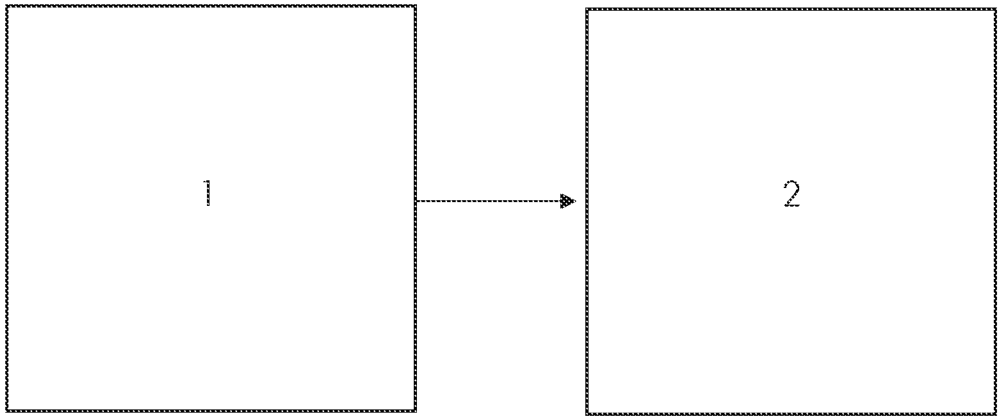
FIG. 1 shows schematically the sensor according to the invention.

Other characteristics and advantages of the present invention will be derived from the non-limitative following description, and by making reference to the drawings and the examples.

The sensor according to the invention comprises a MEMS microphone 1 and a processing means 2.

The MEMS microphone 1 is a microphone realized as microelectromechanical systems (MEMS). MEMS microphones are realized normally in one electronic chip which can be mounted on a circuit, e.g. a printed circuit board. The MEMS microphone 1 has a noise spectrum depending on the fluid to be analyzed.

The noise of the MEMS microphone 1 essentially reflects the sensitivity function. The characteristics of the noise spectrum depend on the design of the MEMS microphone (fixed influence) and on the fluid in the MEMS microphone 1 (variable influence which can be measured). The noise of the MEMS microphone 1 has a resonance due to geometric reasons of the design of MEMS microphone 1. The noise of the MEMS microphone 1, in particular its resonance, is intrinsic to the MEMS microphone 1, in particular to its design and/or geometry. This resonance of the noise of the MEMS microphone 1 depends on the fluid. The noise resonant frequency of the resonance depends for example on the sound velocity in the fluid, i.e. on the density of the fluid.

This noise resonance is common to all MEMS microphones 1. The noise resonant frequency is preferably above 15 kilohertz (kHz), preferably above 16 kHz, preferably above 17 kHz, preferably above 18 kHz, preferably above 19 kHz. The noise resonant frequency is preferably below 100 kHz, preferably below 80 kHz, preferably below 60 kHz, preferably below 50 kHz, preferably below 40 kHz, preferably below 30 kHz, preferably below 25 kHz, preferably below 24 kHz, preferably below 23 kHz. This noise resonance creates a de facto acoustic resonator of relatively poor quality. The noise resonant frequency of this acoustic resonator depends on the sound velocity of the fluid in the MEMS microphone 1. The sound velocity in turn depends on the density of the fluid. Therefore, the noise spectrum of the MEMS microphone 1, in particular its noise resonant frequency can be used as a balance or to determine the density. And with the density, the components of relatively simple fluid mixtures can be determined. Also, other characteristics of the noise spectrum of the MEMS microphone 1 depend on the fluid in the MEMS microphone 1. For example, the width and/or amplitude of the (peak of the) noise resonance can alternatively or in addition be used to determine information about the fluid. There might be further noise resonances at higher frequencies. Also, the information of further noise resonances (e.g. frequency, width and/or amplitude) as characteristic(s) of the noise spectrum can be used to determine property or properties of the fluid.

The MEMS microphone 1 comprises preferably also the power amplifier to amplify the signal measured in the MEMS microphone 1. The MEMS microphone 1 comprises preferably further an analogue to digital converter (ADC) to convert the (amplified) signal measured in the MEMS microphone 1. The amplifier and/or the ADC can be arranged on the same chip as the remaining MEMS microphone 1 but could also be arranged on distinct chips or circuitry.

Preferably, the MEMS microphone 1 is a standard MEMS microphone 1 as used for recording audio signals, e.g. in consumer electronics. Such MEMS microphones 1 output normally a digital audio output with a sampling frequency of 44 kHz. However, it would also be possible to develop a dedicated MEMS microphone for this special sensor application.

The MEMS microphone 1 is realized preferably such that the fluid in the MEMS microphone 1 is in free fluid communication with the fluid of the atmosphere surrounding the sensor. However, it would also be possible that the fluid in the MEMS microphone 1 can be closed in measurement chamber including the MEMS microphone 1. In this case, the measurement chamber could be brought in contact with the atmosphere or fluid to be measured to insert a sample of the atmosphere or fluid to be measured. Once the sample is taken in the measurement chamber, the measurement chamber could be closed to perform the measurement. This can be helpful, if the measurement must be performed under certain conditions, e.g. a certain pressure and/or a certain temperature.

The MEMS microphone 1 could be arranged or designed such that it maximizes the noise of the MEMS microphone 1 with respect to the external sound registered, i.e. to reduce the signal to noise ratio of a traditional MEMS microphone 1. This can be realized for example by sound blocking means which reduce the signal strength of the recorded external sound in the measurement signal of the MEMS microphone 1. The sensor could have also two MEMS microphones to do external noise (i.e. noise not resulting from the MEMS microphone 1) cancelling. This can be used as well to reduce the external sound and/or to strengthen the noise signal from the MEMS microphone 1 with respect to other recorded sound and external noise. Such noise cancelling functions with two MEMS microphones are included in many standard audio devices like smartphones and can be used to further increase the quality of the identification of the noise spectrum of the MEMS microphone 1.

Figure 2:
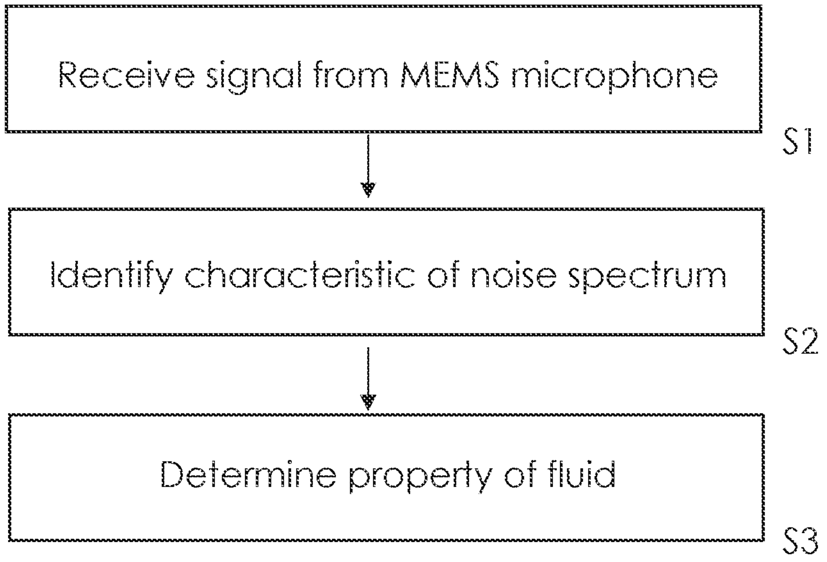
FIG. 2 shows in a diagram the main steps of the computer program or the signal processing means according to the invention.

The processing means 2 is configured to perform the steps shown in FIG. 2. The processing means 2 is preferably realized as a digital processing means. The processing means 2 is preferably a general processing unit like a general processing unit (GPU), Central processing unit (CPU) or a microchip configured to perform the subsequent steps. However, it is also possible that parts of the described steps of the processing means or all steps are realized in an analogue processing means 2.

In step S1, the processing means 2 receives a measurement signal from the MEMS microphone 1. The measurement signal is preferably an audio signal. The audio signal is preferably a digital audio signal. The digital audio signal has for example a sampling frequency of 44 kHz. However, in some embodiments, it is also possible that the measurement signal is a pre-processed signal. E.g. the measurement signal can already be band-passed around the expected noise resonant frequency. E.g. the measurement signal can be filtered by a band pass with a band between 10 KHz and 25 kHz or with a high pass filter above a lower frequency threshold (see below in S2). However, in a preferred embodiment, the processing means 2 receives the measurement signal as a digital signal, preferably as a standard audio digital signal. The standard audio signal can already be pre-processed (with analogue or digital measures) to increase the strength of the noise spectrum of the MEMS microphone 1 with respect to other signal parts like external audio recordings.

In step S2, the processing means 2 identifies a characteristic of the noise spectrum (noise characteristic) of the MEMS microphone 1 in the measurement signal received. In other words, the processing means 2 identifies in the measurement signal received a noise characteristic intrinsic to the MEMS microphone 1. The noise characteristic identified depends on the fluid characteristics of the fluid situated within the MEMS microphone 1. The characteristic of the noise spectrum comprises preferably one or more of the frequency, amplitude and/or width of one or more noise resonance(s) (peaks in the noise spectrum). The frequency, amplitude and/or width of one or more noise resonance(s) (peaks in the noise spectrum) identified depend on fluid characteristics of the fluid situated within the MEMS microphone 1. The characteristic(s) of the noise spectrum is/are determined preferably by a spectral analysis of the measurement signal. In a preferred embodiment, the characteristic of the noise spectrum of the MEMS microphone is the noise resonant frequency of the MEMS microphone 1. There are many ways to achieve this. Preferably, the measurement signal is spectrally analyzed to identify the noise resonant frequency. For example, the Fourier transform of the measurement signal can be performed to obtain the spectral components of the measurement signal. In the spectral analysis of the measurement signal, e.g. its Fourier transform, the maximum noise peak is identified as noise resonant frequency. Preferably, the maximum noise peak in a certain frequency window is determined as noise resonant frequency. The size of the certain frequency window can be determined by the potential density variations of the fluid to measure/sense. For example, the lower border of the certain frequency window can be larger than 10 kHz, preferably than 12 kHz, preferably than 14 kHz, preferably than 15 kHz, preferably than 17 kHz. For example, the upper border of the certain frequency window can be smaller than 25 kHz, preferably than 23 kHz, preferably than 22 kHz, preferably than 21 kHz, preferably than 20.5 kHz. It is also possible to use other noise resonances above the first resonant frequency as characteristic(s) of the noise spectrum. These other noise resonances at higher frequencies can be higher orders of the first resonant frequency or can be resonant frequencies caused by other reasons, e.g. a different resonant frequency in a second direction of the MEMS microphone or due to particularities of the fluid like higher order resonances as characteristic. It is further possible to use alternatively or in addition, the width of the peak(s) which also depend on the fluid in the MEMS microphone 1. The characteristic of the noise spectrum can also contain a combination of different characteristics of the noise spectrum of the MEMS microphone 1 (like different noise resonant frequencies and/or its widths) in order to determine the density or composition of the fluid in more detail or for more complex fluid mixtures. To increase the precision of the noise resonant frequency identified, a peak curve (like a Lorentzian peak curve) can be fitted to the spectral analysis of the measurement signal to determine the noise resonant frequency at a precision below the sampling frequency. Such a fitting can also be used to determine the width and/or amplitude of the peak. If more than one peak is used, this fitting is repeated for each peak. The width of the peak shall be the width of the peak at a half of the maximum amplitude of the peak. So, contrary to state-of-the-art use of microphones which try to identify a "sound" from the surroundings recorded with the microphone (while the noise characteristics of the MEMS microphone would be a disturbance), the present invention identifies rather this noise characteristic of the MEMS microphone (while the "sound" from the surroundings recorded with the microphone would be the disturbance) which depend on the property or properties of the fluid in which the MEMS microphone is situated.

In step S3, a property of the fluid is determined based on the characteristic determined in step S2. The property of the fluid can be the density, the viscosity, the composition or also other properties of the fluid.

Since the noise resonant frequency depends on the velocity of sound in the fluid in the MEMS microphone and since the velocity of sound in the fluid depends on the density of the fluid, the density of the fluid can be determined based on the noise resonant frequency determined in step S2. This can be done for example by calibration data which stores the relationship between the noise resonant frequency and the fluid density measured with other measurement sensors. This can result simply in a look-up table. This can also be done by a mathematical equation approximating the relationship between the density and the noise resonant frequency density=function of noise resonant frequency.

The parameters for this density function can be determined by physical formulas and parameters or can be determined by calibration or measurement for the specific MEMS microphone 1. Since also other characteristics of the noise spectrum depend on the density, like for example the width of the peak(s) of the noise spectrum, also other characteristics of the noise spectrum can be used to determine the density with an alternative characteristic or to determine the density with a higher precision based on two or more characteristics.

Figure 3:
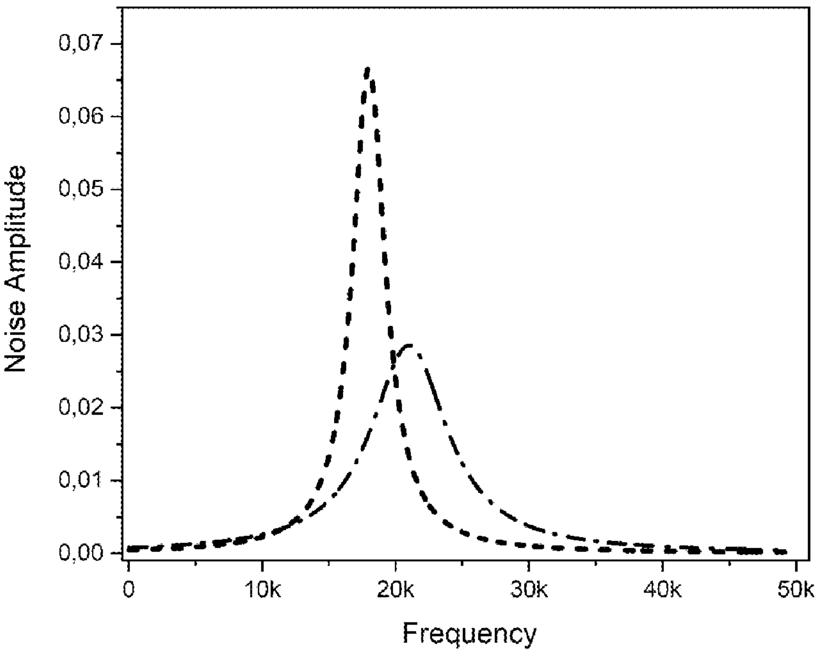
FIG. 3 shows the noise spectrum of a MEMS microphone for two different gases.

The noise spectrum depends also on the type of fluid/gas in the MEMS microphone 1. FIG. 3 shows for example two simple noise spectra for two different types of fluids. Such simple noise spectra have normally one noise resonance. The frequency, width and/or amplitude of this noise resonance can be used as characteristic(s) of the noise spectrum to determine the composition of the fluid. In rare cases, the fluid is a pure fluid/gas consisting of only one type of molecule or component. In this case, determining the composition of the fluid/gas would be to determine the type of molecule of the pure fluid/gas in the MEMS microphone 1.

The fluid in the MEMS microphone 1 is often a fluid mixture consisting of different fluid components/molecules. Stable single atoms shall be considered herein as molecules as well. Each fluid component/molecule in the fluid mixture is present at a certain concentration with respect to the fluid mixture. The concentration can be measured in different unities, e.g. based on the mass (percentage of mass of the component with respect to the total mass of fluid mixture), based on the volume (percentage of volume of the component with respect to the total volume of fluid mixture), based on the number of particles/molecules (number of particles of the component with respect to the total number of particles of fluid mixture).

When the concentration of one component/molecule in a fluid mixture changes, the noise spectrum changes, e.g. due to a change of the density of the fluid mixture. To determine the composition of a fluid mixture shall mean that the concentration of at least one component of the fluid mixture is determined. Determining the concentration of at least one component could mean for example also to determine the (relative) ratio of two components of the fluid mixture. Thus, the composition of the fluid can be determined based on the characteristic of the noise spectrum. This can be done for example by calibration data which stores the relationship between the characteristic identified and the composition of the fluid measured with other measurement sensors. This can result simply in a look-up table. This can also be done by a mathematical equation Concentration/composition=function of characteristic.

The parameters for this concentration function can be determined by physical formulas and parameters or can be determined by calibration as explained above. The concentration of at least one component in simple fluid mixtures made of two components can be determined simply based on the noise resonant frequency. If the concentration of one component might depend further on other physical parameters like pressure and/or temperature, the concentration measurement might consider further sensor measurements to determine the concentration. One component refers preferably to one molecule. However, one component could also refer to a mixture of components itself. Especially, when determining the concentration of a first component with respect to a second component in a fluid mixture consisting of two types of components, the second component could be defined as all other components in the fluid except the first component, especially when the relative concentration between the other components within the second component do not change among each other. Example for such simple (two component) gases will be explained below.

One application can be a fluid mixture of oxygen ($O_2$, component 1) and hydrogen ($H_2$, component 2), especially wherein one of the two components is present only in small quantities, e.g. as a trace gas. This can be interesting for a sensor measuring in an $O_2$ tank the percentage of the trace gas H2. Alternatively, the sensor could measure in an H2 tank/storage the percentage of the trace gas O2.

Another application could be to detect the presence of highly explosive hydrogen (H2) in a gas mixture, e.g. in the atmosphere. This can help to detect leakages in hydrogen infrastructure and prevent explosions before the H2 concentration becomes too high.

Another application is the detection of biogas which contains as main components carbon dioxide (Co2, component 1) and methane (CH4, component 2). The sensor could determine the concentration of one of the two components or their ratio based on the noise resonant frequency.

Figure 6:
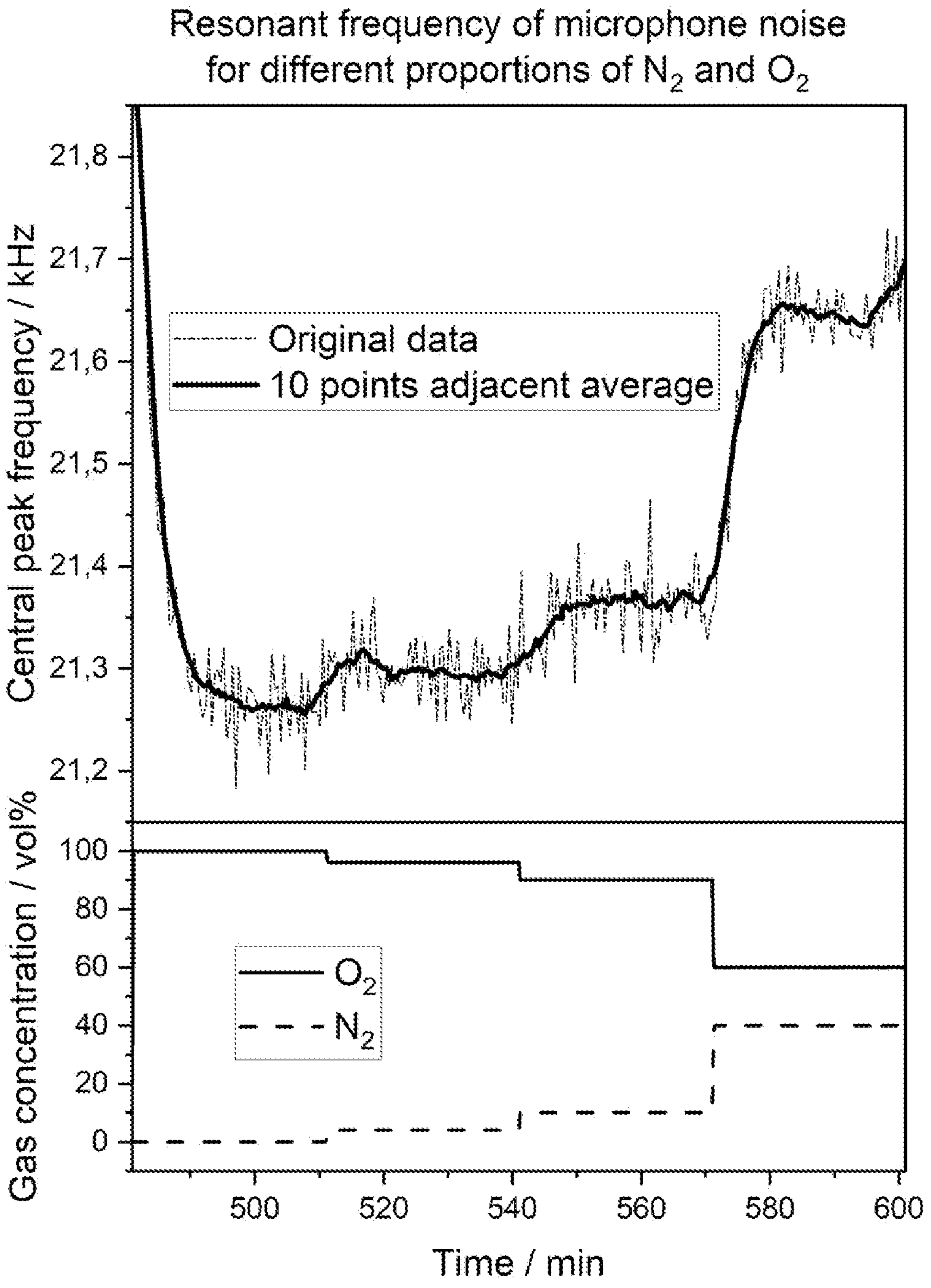
FIG. 6 shows an example measurement with a MEMS microphone for the percentage of nitrogen or oxygen in a nitrogen-oxygen mixture.

Another application is the detection of nitrogen (N2, component 1) or oxygen (O2, component 2) in a gas mixture of nitrogen and oxygen. The sensor could determine the concentration of one of the two components or their ratio based on the noise resonant frequency. FIG. 6 shows an example measurement over time of the noise resonance frequency. The measurement shows clearly how the noise resonance frequency changes based on the ratio of O2 and N2 in the mixture. For the first 30 minutes, the MEMS microphone is arranged in a pure oxygen gas and measures the noise frequency of roughly 21.26 kHz. For the next 30 minutes, the MEMS microphone is arranged in a gas mixture with 95% of oxygen and 5% of nitrogen and measures the noise frequency of roughly 21.30 KHz. For the next 30 minutes, the MEMS microphone is arranged in a gas mixture with 90 of oxygen and 10% of nitrogen and measures the noise frequency of roughly 21.35 kHz. For the next 30 minutes, the MEMS microphone is arranged in a gas mixture with 60% oxygen and 40% nitrogen and measures the noise frequency of roughly 21.65 kHz. This shows how sensitive the noise frequency of the MEMS microphone is to detect the concentration of the nitrogen-oxygen mixture. Even in more complex gas/fluid mixtures, it is possible to determine the concentration of one component, if the second component is considered itself as a component mixture whose relative composition does not change.

Figure 5:
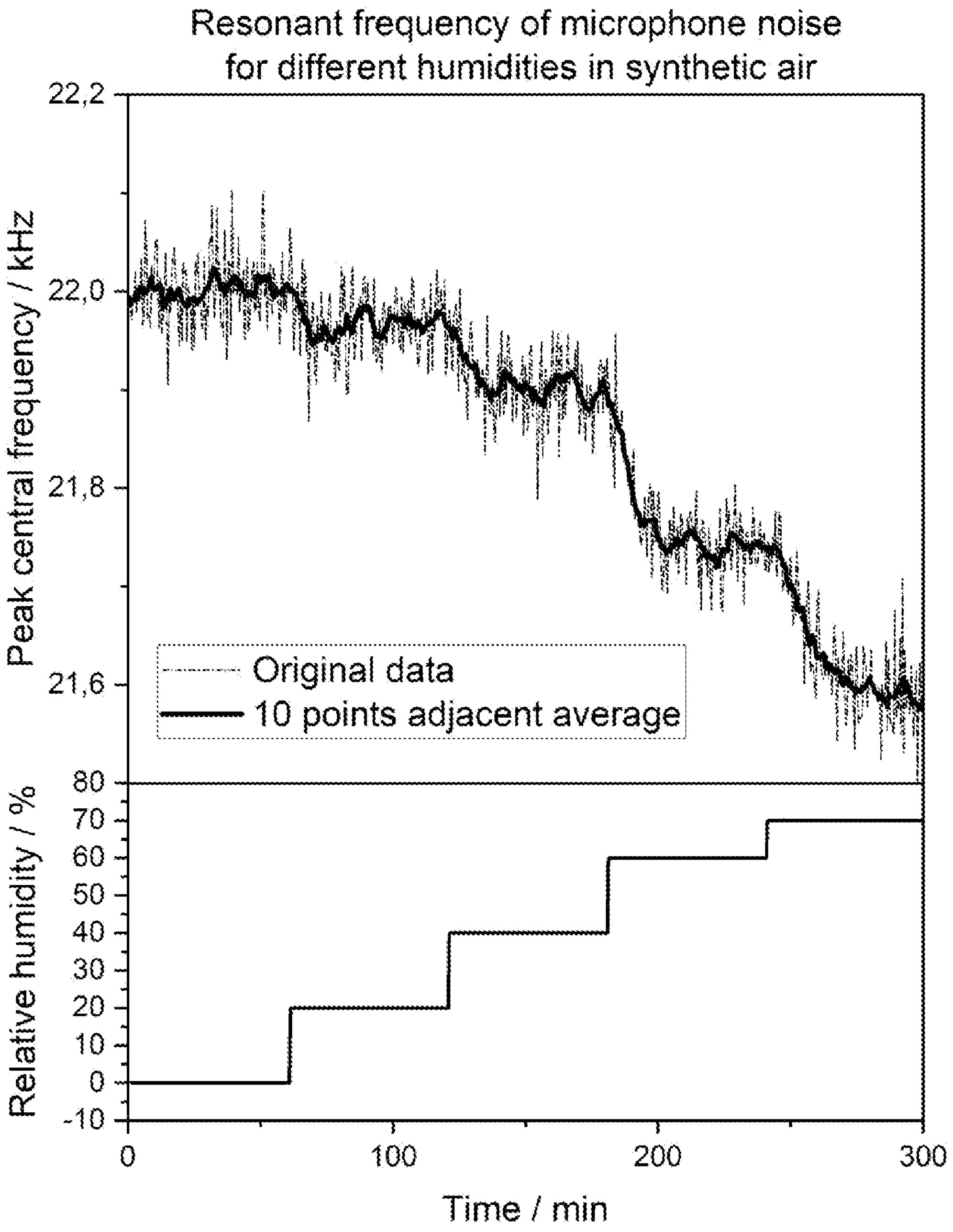
FIG. 5 shows an example measurement for relative humidity with a MEMS microphone.

One application might be the detection of humidity (H2O) in air or in other gas mixtures. For example, the detection of the relative humidity (H2O, component 1) in the atmosphere can be measured with a MEMS microphone. Thus, the second component would here be the atmosphere without the humidity. FIG. 5 shows an example measurement over time of the noise resonance frequency for different humidity levels with respect to a synthetic atmosphere. The measurement shows clearly how the noise resonance frequency changes based on the level of humidity in the mixture. For the first 60 minutes, the MEMS microphone is arranged in an atmosphere with a relative humidity of 0% and measures the noise frequency of roughly 22.0 KHz. For the next 60 minutes, the MEMS microphone is arranged in an atmosphere with a relative humidity of 20% and measures the noise frequency of roughly 21.96 KHz. For the next 60 minutes, the MEMS microphone is arranged in an atmosphere with a relative humidity of 40% and measures the noise frequency of roughly 21.90 KHz. For the next 60 minutes, the MEMS microphone is arranged in an atmosphere with a relative humidity of 60% and measures the noise frequency of roughly 21.73 kHz. For the next 60 minutes, the MEMS microphone is arranged in an atmosphere with a relative humidity of 70% and measures the noise frequency of roughly 21.63 kHz. This shows how sensitive the noise frequency of the MEMS microphone is to the detect the concentration of the relative humidity in a synthetic atmosphere.

These are only some few examples. The sensor can basically replace any gas sensor which currently uses a thermal conductivity detector used in gas chromatography.

Figure 4:
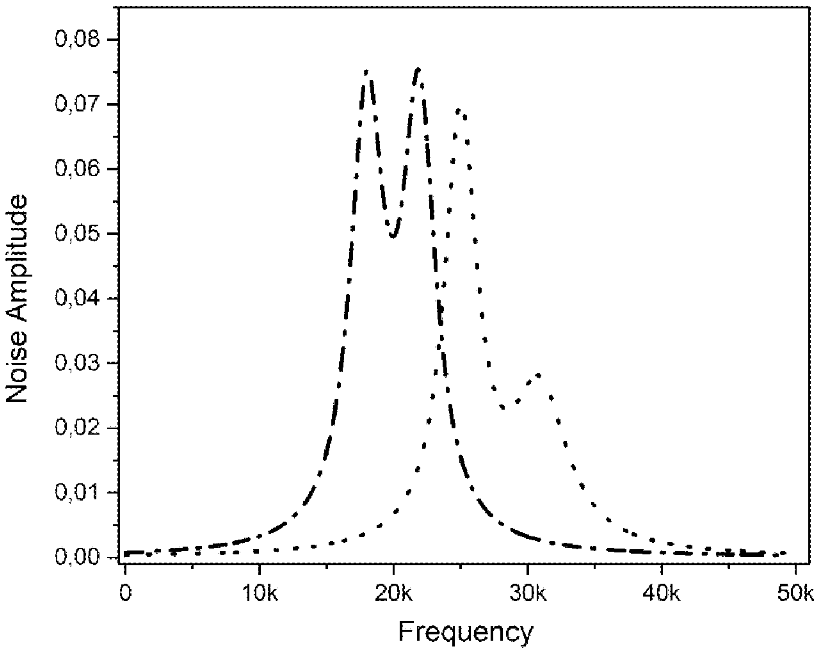
FIG. 4 shows the noise spectrum of a MEMS microphone for two different gases.

The inventors found out that it is even possible to detect the concentration of different components or of one component in more complex gas/fluid mixtures when considering a plurality of different characteristics of the noise spectrum, for example two or more of the frequency, width and amplitude of one or more noise resonances in the noise spectrum or for example a one or more of the frequency, width and amplitude of two or more noise resonances in the noise spectrum. Preferably, two, three or more resonance peaks are determined in a frequency spectrum above 15 kHz, preferably above 16 kHz, preferably above 17 kHz, preferably above 18 kHz. It is for example possible to determine the concentration of one component in a more complex fluid mixture, when considering the relative parameters of different peaks (frequency, width and/or amplitude). FIG. 4 shows such a more complex noise spectrum with two peaks for two different fluids. It can be seen that in a first fluid (dashed-dotted line), the two peaks have roughly the same amplitude and same width, while in the second fluid (dashed line), the second noise resonance has a much smaller amplitude. This could allow to determine in real air different parameters like two or more of density, pressure, temperature, relative humidity, concentration of certain atmospheric components like (CO2, N2). So, any MEMS microphone could be transferred into a small weather station or air quality sensor. Even a fire detector could be realized by measuring the increase of carbon monoxide over a certain threshold.

It could be possible to use in S3 a machine learning engine to determine the property of the fluid based on a set of characteristics determined from the noise spectrum, e.g. frequency, amplitude and width of first noise resonance and frequency, amplitude and width of second noise resonance. When training the machine learning engine with different noise spectra, i.e. with the above-mentioned set of characteristics for known fluids, the machine learning engine can learn to determine even complex compositions of fluids.

Another application of the invention would be to check the fluid density or fluid composition in a photoacoustic sensor. The photoacoustic sensor uses often a MEMS microphone to determine the absorption spectrum of the fluid to be measured. The MEMS microphone 1 of the photoacoustic sensor could be used to determine in addition the density and/or composition of the fluid around the MEMS microphone 1. In a traditional photoacoustic sensor, this would be the fluid to be measured and additional information about the fluid to be measured could be retrieved by the same sensor. In other photoacoustic sensors, the MEMS microphone 1 is arranged in a sealed measurement chamber filled with a reference fluid. The MEMS microphone 1 could be used in this case to verify, if the reference fluid has still the same composition or density as it should.

In a preferred embodiment, the fluid (whose density or composition is determined) is a gas. However, the measurement principle works equally for a liquid.

The processing means 2 and the MEMS microphone 1 can be realized in the same housing/device. The sensor with the MEMS microphone 1 and the full processing means 2 described in FIG. 2 can be integrated in the same sensor housing which outputs then the final result of the density measurement or the composition of the fluid. It is however also possible that the MEMS microphone 1 and the processing means 2 are locally separated or are arranged in different physical units. This would allow to use a MEMS microphone 1 in a measurement site and send the audio signal measured to a remote processing means 2 where it is processed as described in FIG. 2, e.g. a remote server. It is obviously also possible that the processing means 2 is realized distributed, i.e. a part of the processing described in FIG. 2 is realized in the sensor unit with the MEMS microphone 1 and another part of the processing described in FIG. 2 is realized in a remote processing unit.

The invention allows that any common MEMS microphone 1 can be converted in a density sensor and/or a fluid mixture component detector. This allows to make new density or composition sensors out of MEMS microphones 1. The invention allows further to convert any programmable device with a processor 2 and a MEMS microphone 1 into a sensor according to the invention, when programming the processor 2 to perform the steps of FIG. 2. The invention would allow thus to measure the density of air in a smartphone or any other programmable consumer device with a MEMS microphone by simply upgrading the consumer device with a software or app for processing the audio signal measured as described in FIG. 2. This would allow for example to realize a H2 detector as described above simply by a smartphone app uploaded to the smartphone. Thus, each visitor or employee of hydrogen infrastructure could carry a cheap H2 detector. This could further allow to detect density, humidity, temperature and/or absolute pressure from the noise spectrum of the air or atmosphere around the smartphone.

It should be understood that the present invention is not limited to the described embodiments and that variations can be applied without going outside of the scope of the claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor for determining a property of a fluid, the sensor comprising:

a MEMS microphone having a noise spectrum, intrinsic to the MEMS microphone depending on a fluid to be analyzed, wherein the noise spectrum has a noise resonance due to the geometric design of the MEMS microphone, wherein the noise resonance depends on the sound velocity of the fluid; and processor configured to receive a measurement signal recorded by the MEMS microphone and containing the noise resonance;

identify in the measurement signal a characteristic of the noise resonance; and determine the property of the fluid based on the characteristic identified.

2. The sensor according to claim 1, wherein the characteristic of the noise spectrum of the MEMS microphone comprises a noise resonant frequency of the noise resonance.

3. The sensor according to claim 1, wherein the characteristic of the noise spectrum of the MEMS microphone comprises a width and/or an amplitude of the noise resonance.

4. The sensor according to claim 2, wherein the characteristic of the noise spectrum of the MEMS microphone comprises a further width and/or a further frequency and/or a further amplitude of a further noise resonance of the noise spectrum of the MEMS microphone.

5. The sensor according to claim 1, wherein the property of the fluid comprises a density of the fluid.

6. The sensor according to claim 1, wherein the property of the fluid comprises a composition of the fluid.

7. The sensor according to claim 6, wherein determining the composition of the fluid means to determine the concentration of at least one type of molecule in the fluid consisting of a mixture of different types of molecules.

8. The sensor according to claim 7, wherein the processor is configured to determine the concentration of hydrogen in a certain fluid.

9. The sensor according to claim 7, wherein the processor is configured to determine the concentration of hydrogen or oxygen in a gas mixture comprising hydrogen and oxygen.

10. The sensor according to claim 1, wherein the fluid is a gas.

11. The sensor according to claim 1, wherein the MEMS microphone is the built-in microphone of a smartphone.

12. The sensor according to claim 1, wherein the MEMS microphone and the processor is realized in the same physical object.

13. The sensor according to claim 1, wherein the MEMS microphone and the processor is realized in distinct physical objects.

14. A sensor according to claim 1, wherein the measurement signal is an audio signal.

15. A sensor according to claim 1, wherein the noise resonance is an acoustic resonance of the MEMS microphone.

16. A sensor according to claim 1, wherein the measurement signal is passively recorded by the MEMS microphone and represents acoustic noise.

17. A sensor according to claim 1, wherein the measurement signal is an output signal of the MEMS microphone in response to acoustic pressure variations without applying an excitation signal to the MEMS microphone.

18. A sensor according to claim 1, wherein the processor is configured to determine the property of the fluid based on the characteristic identified using the dependence of the fluid on the sound velocity.

19. A non-transitory computer program configured to perform the following steps when executed on a processor:

receive a measurement signal recorded by a MEMS microphone containing a noise spectrum intrinsic to the MEMS microphone, wherein the noise spectrum has a noise resonance due to the geometric design of the MEMS microphone, wherein the noise resonance depends on the sound velocity of the fluid;

identify in the measurement signal a characteristic of the noise resonance of; and determine a property of the fluid based on the characteristic identified.

20. A method for measuring characteristics of a fluid, the method comprising:

recording a measurement signal in a MEMS microphone arranged in the fluid, wherein the recorded measurement signal contains a noise resonance intrinsic to the MEMS microphone, wherein the noise spectrum has a noise resonance due to the geometric design of the MEMS microphone, wherein the noise resonance depends on the sound velocity of the fluid;

identifying with a process a characteristic of the noise resonance of the noise spectrum of the MEMS microphone in the measurement signal; and determining with the processor a property of the fluid based on the characteristic identified.

* * * * *